July 14, 1953  O. MAISCH  2,645,245
PIPETTE CONTROL MEANS
Filed Aug. 29, 1951  2 Sheets-Sheet 1

Inventor:
Oliver Maisch
By Wm. G. Freudenreich
Attorney

July 14, 1953 — O. MAISCH — 2,645,245
PIPETTE CONTROL MEANS
Filed Aug. 29, 1951 — 2 Sheets-Sheet 2

Inventor:
Oliver Maisch,
By Wm. F. Freudenreich,
Attorney.

Patented July 14, 1953

2,645,245

UNITED STATES PATENT OFFICE 2,645,245

PIPETTE CONTROL MEANS

Oliver Maisch, Chicago, Ill.

Application August 29, 1951, Serial No. 244,250

7 Claims. (Cl. 137—569)

1

The primary object of the present invention is to make it possible automatically to dispense successive, accurately measured volumes of various liquid materials.

In a specific sense my invention may be regarded as having for its object to control the pumping of liquids so that, using a continuously operating pump, accurately measured volumes or units are dispensed automatically and in such a manner that the handling of the dispensed liquid is simple and easy and the opportunity for error due to human frailty is negligible.

In carrying out my invention I employ a pump the speed of which may be controlled to cause the pump to discharge any desired volume of liquid, accurately measured, in a given period of time. The outlet from the pump is through two flexible tubes or pipettes, one of which constitutes the dispensing line while the other is a bypass line leading back to the intake side of the pump. Then, with the pump running continuously, by alternately pinching or collapsing the pipettes to stop flow therethrough, liquid may be caused to flow through either, but not through both at the same time.

A further object of the invention is to produce a simple, novel, reliable and efficient means for effecting the collapse and subsequent release of each pipette in a manner and at times determined by the end results sought.

In order that measuring of dispensed liquids shall be accurate, the changes in the conditions of the pipettes must take place instantaneously. Therefore, in one aspect of my invention, it may be said to have for an object to produce a simple and novel mechanism which, in cooperation with two pipettes, forms, in effect, a compound, snap-action control valve.

Figure 1:
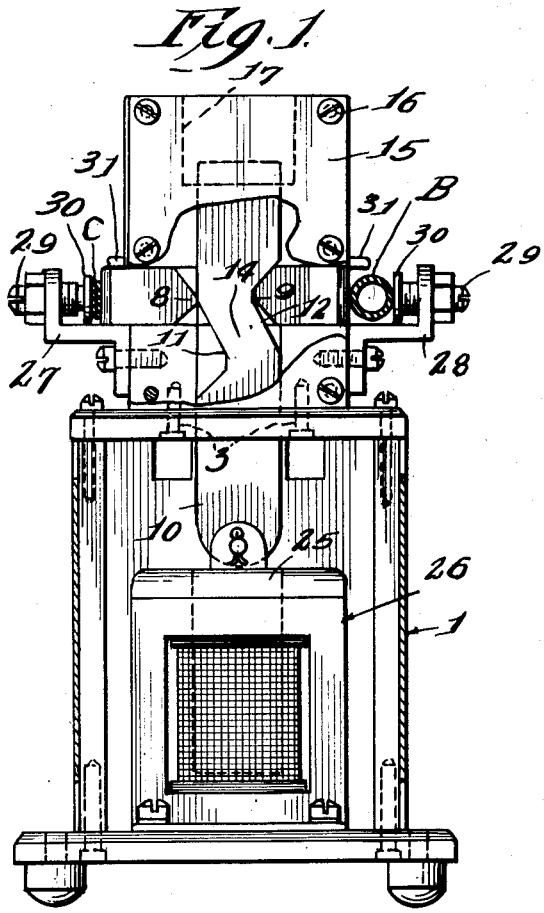
Figure 2:
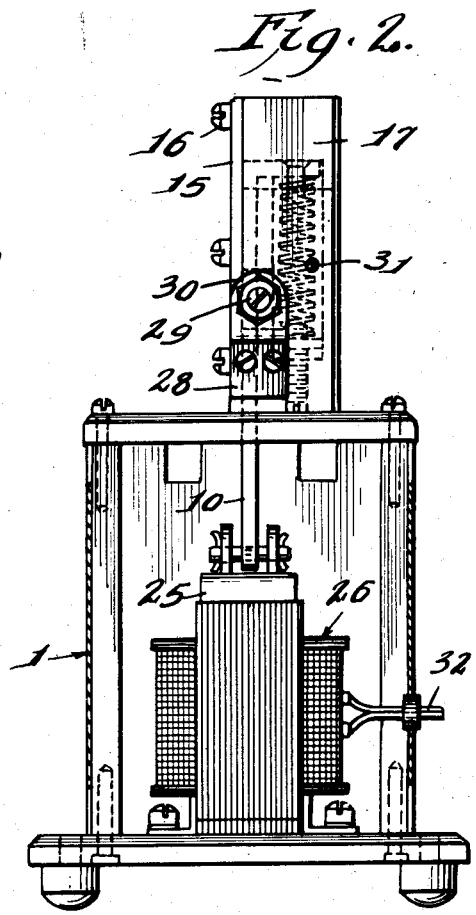
Figure 3:
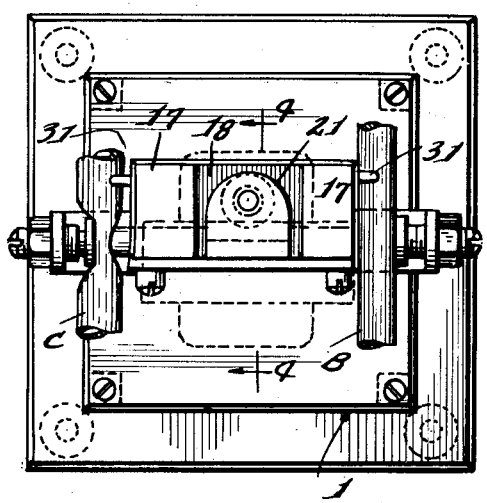
Figure 4:
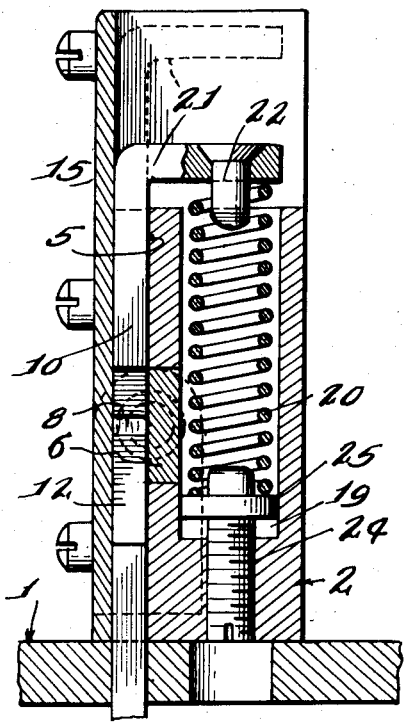

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figure 1 is a front view of a valve device embodying the present invention, portions of the casing being omitted and two pipettes therein being shown in section; Fig. 2 is a side view of said device, a part of the casing being omitted; Fig. 3 is a top plan view of the valve device, including pieces of two pipettes arranged therein; Fig. 4 is a section, on a larger scale, on line 4—4 of Fig. 3, showing only the upper portion of the

Figure 8:
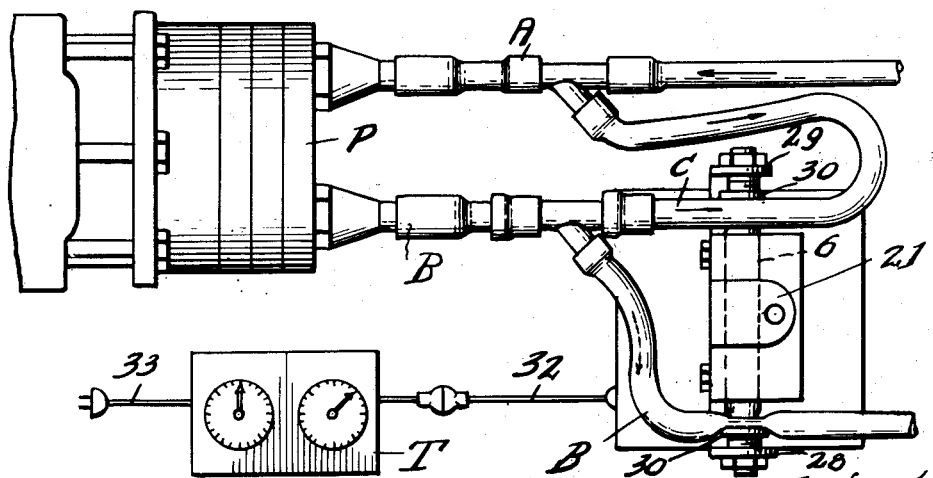
Figure 5:
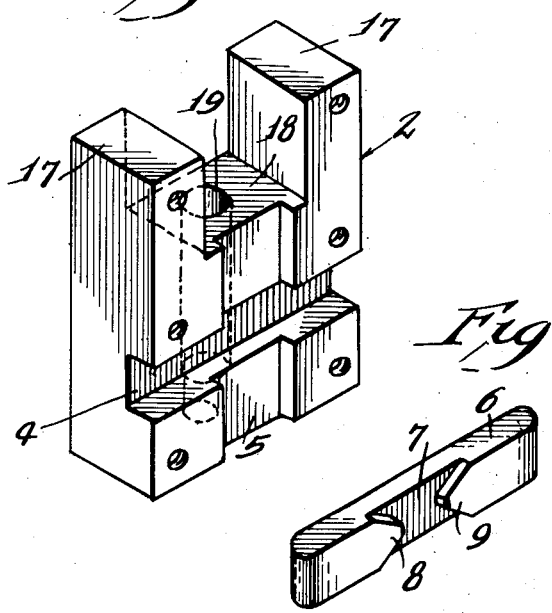
Figures 6, 7:
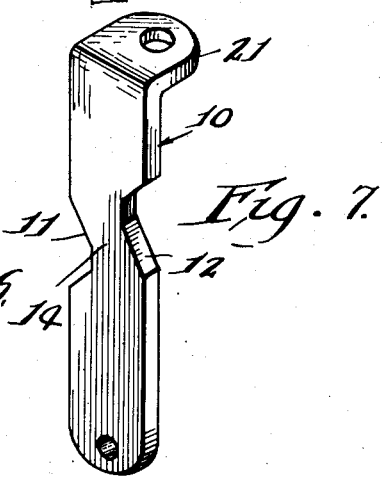

2 device; Fig. 5 is a perspective view of the supporting block for the two crossing slides; Fig. 6 is a perspective view of the horizontal, pinching slide; Fig. 7 is a perspective view of the vertical slide or cam bar that actuates the other slide; and Fig. 8 is a more or less diagrammatic view illustrative of an automatic time controlled system of which the valve device forms part.

Referring to Figs. 1–7 of the drawings, 1 represents a sturdy, box-like base upon which stands a tall, slab-like block 2. The block may be fastened to the base in any suitable way as, for example, by bolts 3 extending up into the same through the top wall of the base, as shown in Fig. 1.

In the front side of block 2 are two wide, intersecting slots 4 and 5, slot 4 being horizontal and slot 5 being vertical and centrally located with respect to the block. Slot 4 is deeper than the other slot.

Within and slidable in slot 4 is a bar 6 the thickness of which equals the depth of that slot and which is a little longer than the width of the block. In the front face of bar 6, midway between the ends thereof, is a recess 7 somewhat wider than and of the same depth as slot 5. Axially arranged, nose-like lugs 8 and 9 protrude into the recess with their tips spaced apart a distance substantially less than the width of slot 5. When bar 6 is in its slot it fills the same and its recess 7 bridges the gap in slot 5 at the intersection of the two slots.

Within slot 5 is a long, flat bar 10, as wide as and having a thickness equal to the depth of the slot. In the long edges of bar 10 are two long, deep, reversely arranged cam notches 11 and 12 that are displaced relative to each other lengthwise of the bar but in overlapping relation to each other. These notches are so shaped that the reduced neck portion 14 of the bar, separating the cam notches, fits slidably between the tips of lugs 8 and 9. In the particular arrangement illustrated, when either lug is in the deep end of the corresponding notch, the other lug is engaged with an unmutilated portion of the edge of the cam bar just beyond the shallow end of the other cam notch.

There is a thick cover plate 15 on the front side of block 2, held in place by screws 16, to keep bars 6 and 10 in their respective slots, while leaving them free to slide.

A deep, wide central section is cut out of block 2 at the top, leaving heavy upright parts 17 rising at opposite sides of the effective top face 18 of the block. Extending down through this face is a deep well 19 within which is located a long compression spring 20 which, when expanded, reaches to the top of elements 17. On the upper end of cam bar 10 is a rearwardly directed horizontal flange or lip 21 that overlies the spring and is provided with a pin 22 that enters and centers the spring. The initial compression of the spring may be varied by a screw 24 extending up into the block and serving as an adjustable support for a small follower disk 25 which constitutes the immediate support for the lower end of the spring.

The lower end of cam bar 10 extends down through the top wall of the base and is there connected with the movable core or armature 25 of a solenoid or electromagnet 26.

The parts are so proportioned that when the solenoid is energized the cam bar is held in its down position, as shown in full lines in the drawings; whereas the spring at all other times holds the bar up as indicated in dotted lines in Fig. 4. Fixed to the opposed side edges of block 2 are two similar brackets 27 and 28, each having a part facing but spaced apart from the corresponding end of bar or slide 6. Each bracket is provided with a screw 29 axially aligned with this bar and having on its inner end a head or anvil 30. By adjusting the screws the anvils may be moved closer to or farther apart from each other.

In using the device, two flexible tubes or pipettes, B and C, are placed on the brackets, each between one of the anvils and the adjacent end of slide 6. The parts are so adjusted that, when either of the tubes retains its normal shape, the other tube is pinched shut or collapsed between the adjacent anvil and the adjacent end of the horizontal slide or pinch bar 6. Thus, by employing a strong spring and a powerful electromagnet, and alternately energizing and deenergizing the latter, the device serves the same purpose as a snap-action valve in each of the tubes or pipettes.

The tubes are prevented from jumping out of their seats by pins 31, projecting from the side edges of block 2 part way across such seats.

Fig. 8 illustrates a pipette control system in which the pipette pinching apparatus is advantageously employed. In this system P is a motor driven precision pump having an inlet conduit A and a discharge conduit B through which liquid is pumped and dispensed. C is a bypass connecting the intake conduit to the outlet conduit at a point near the pump. All three conduits may be soft rubber tubes, although only conduits B and C, or sections thereof, need be flexible.

T is a timer for controlling the electromagnet, the terminals of the latter being connected to the timer by a cable 32; and the timer being provided with a cable 33 to plug the same into a power circuit.

Tubes or pipettes B and C are inserted in the valve device as heretofore explained. Since the electromagnet is deenergized, the cam bar is up as shown in broken lines in Fig. 4. The user can depress the cam bar by pressing down on lip or flange 21, on the upper end of the cam bar, to facilitate the insertion of the tubes in the pinching or clamping means.

With the electromagnet still deenergized, the discharge tube B is in a collapsed state, while bypass tube C is wide open, as in Fig. 8. Therefore the pump may be started, but will only idle, circulating the liquid through the bypass, with none flowing past the collapsed or pinched section of discharge tube B.

Assuming that it is desired to dispense accurately measured quantities of liquid into bottles, for example, the timer is set to allow the electromagnet to remain energized for the exact length of time required by the pump to pump the quantity of liquid desired in a single unit.

With the timer in operation, it first causes the electromagnet to be energized, so that the cam bar is drawn down abruptly. This causes the pinch bar to snap into the position opposite that occupied thereby in Fig. 8; thereby suddenly collapsing the bypass tube and allowing the discharge tube to resume its normal shape. A bottle having been placed in position to receive liquid from the discharge tube, the filling of the bottle starts immediately. This condition is maintained until the timer interrupts the flow of current to the electromagnet, allowing the spring to come into action and restore the conditions existing in Fig. 8, with the discharge tube pinched shut and the bypass open to allow the pump to idle.

If many bottles are to be filled, the timer may be set to energize and deenergize the electromagnet alternately in automatic succession, with periods of deenergization only long enough to enable the operator to remove each bottle and replace it by its successor. However, the means for determining what a cycle shall be, or whether cycles shall automatically repeat themselves, depend on the need in any given use, and may vary widely.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. In a pipetting control device, a stationary support, a pinch bar slidable lengthwise in said support, anvils mounted on the support in alignment with and beyond the ends of the pinch bar, the pinch bar having at the middle two lugs spaced apart lengthwise of the bar, a flat, two-position cam bar, wider than the distance between said lugs and having in opposite edges long cam notches displaced somewhat relatively to each other lengthwise of the cam bar, said cam bar being mounted on said support so as to lie between said lugs with either lug being in the deepest portion of the corresponding cam notch and slidable lengthwise, an electromagnet connected to one end of the cam bar to move it into one of its said positions, and a compression spring parallel to the cam bar and resting at one end on said support and engaged at its other end with the cam bar and tending constantly to hold it in its second position.

2. In a pipetting control device a stationary support, a pinch bar slidable lengthwise in said support, anvils mounted on the support in alignment with and beyond the ends of the pinch bar, the pinch bar having at the middle two lugs spaced apart lengthwise of the bar, a flat, two-position cam bar, wider than the distance between said lugs and having in opposite edges long cam notches displaced somewhat relatively to each other lengthwise of the cam bar, said cam bar being mounted on said support so as to lie between said lugs with either lug being in the deepest portion of the corresponding cam notch and slidable lengthwise from one of its positions to the other, the movable member of an electromagnet connected to one end of the cam bar to move it into one of its positions upon energization of the electromagnet, a laterally extending part on the second end of the cam, and a compression spring bearing at one end against said support and at its other end against said laterally extending part on the cam bar yieldingly to hold that bar in the second of its positions.

3. In a pipetting control device, a stationary support, a pinch bar slidable lengthwise in said support, anvils mounted on the support in alignment with and beyond the ends of the pinch bar, the pinch bar having at the middle two lugs spaced apart lengthwise of the bar, a flat, two-position cam bar, wider than the distance between said lugs and having in opposite edges long cam notches displaced somewhat relatively to each other lengthwise of the cam bar, said cam bar being mounted on said support so as to lie between said lugs with either lug being in the deepest portion of the corresponding cam notch and slidable lengthwise, the movable member of an electromagnet connected to one end of the cam bar, said support containing behind and parallel to the cam a deep well, a compression spring in and resting on the bottom of the well, and a lip on the second end of the cam bar extending over the second end of the spring and holding it at all times under compression.

4. In a pipetting control device, a support, brackets on the exterior and at opposite sides of said support, a transverse pinch bar slidably mounted on the support between and aligned with said brackets, an element mounted on each bracket so as to be adjustable from and toward the pinch bar and serve as an anvil cooperating with the latter to collapse an elastic tube inserted between them, a cam bar mounted on the support for lengthwise sliding movements crosswise of the pinch bar, a spring mounted on the support adjacent to the cam bar and engaged with the latter to move it lengthwise in one direction, an electromagnetic actuator on the support and connected to the cam bar to move it in the opposite direction, and cooperating camming devices on said bars to cause the pinch bar to move back and forth in coordination with the cam bar.

5. In a pipetting control device, a support comprising a hollow base member and a second member rising therefrom, brackets on the exterior and at opposite sides of said second member, a transverse pinch bar slidably mounted on said second member between and aligned with said brackets, an element mounted on each bracket so as to be adjustable from and toward the pinch bar and serve as an anvil cooperating with the latter to collapse an elastic tube placed between them, a cam bar mounted on said second member for lengthwise sliding movements crosswise of the pinch bar, a spring mounted on said second member adjacent to and engaged with the cam bar to move it lengthwise in one direction, an electromagnetic actuator housed in the base member and connected to the cam bar to move it in the direction opposite to the aforesaid direction, and cooperating camming devices on said bars to cause the pinch bar to move back and forth in coordination with the cam bar.

6. In a pipetting control device, a support comprising a hollow base member and a second member rising therefrom, brackets on the exterior and at opposite sides of said second member, a transverse pinch bar slidably mounted on said second member between and aligned with said brackets, an element mounted on each bracket so as to be adjustable from and toward the pinch bar and serve as an anvil cooperating with the latter to collapse an elastic tube placed between them, a cam bar mounted on said second member for lengthwise sliding movements crosswise of the pinch bar, said second member containing a chamber behind and parallel to the cam bar, a spring in said chamber and engaged with the cam bar to move it in one direction, an electromagnetic actuator housed in the base member and connected to the cam bar to move the latter in the opposite direction, and camming devices on said bars cooperating with each other to cause the pinch bar to move back and forth in coordination with the cam bar.

7. In combination, a continuously operating pump having an intake, an elastic delivery tube connected to the discharge side of the pump, an elastic, tubular bypass connecting the delivery tube to said intake, means acting on said bypass and said delivery tube at a point beyond the bypass, alternately to pinch one of them to stop flow therethrough while a free flow through the other is maintained, and a timer controlling the said means to determine the time intervals between successive pinchings.

OLIVER MAISCH.

References Cited in the file of this patent
UNITED STATES PATENTS

| Number | Name | Date |
|---|---|---|
| 2,222,141 | Denison | Nov. 19, 1940 |
| 2,412,428 | Rockwell et al. | Dec. 10, 1946 |
| 2,434,771 | Mueller | Jan. 20, 1948 |
| 2,556,689 | Grove | June 12, 1951 |